Jan. 6, 1948. H. J. HANSEN 2,433,989
MEANS FOR AUTOMATICALLY SUPPLYING DISTILLED WATER TO STORAGE BATTERIES
Filed Oct. 22, 1946
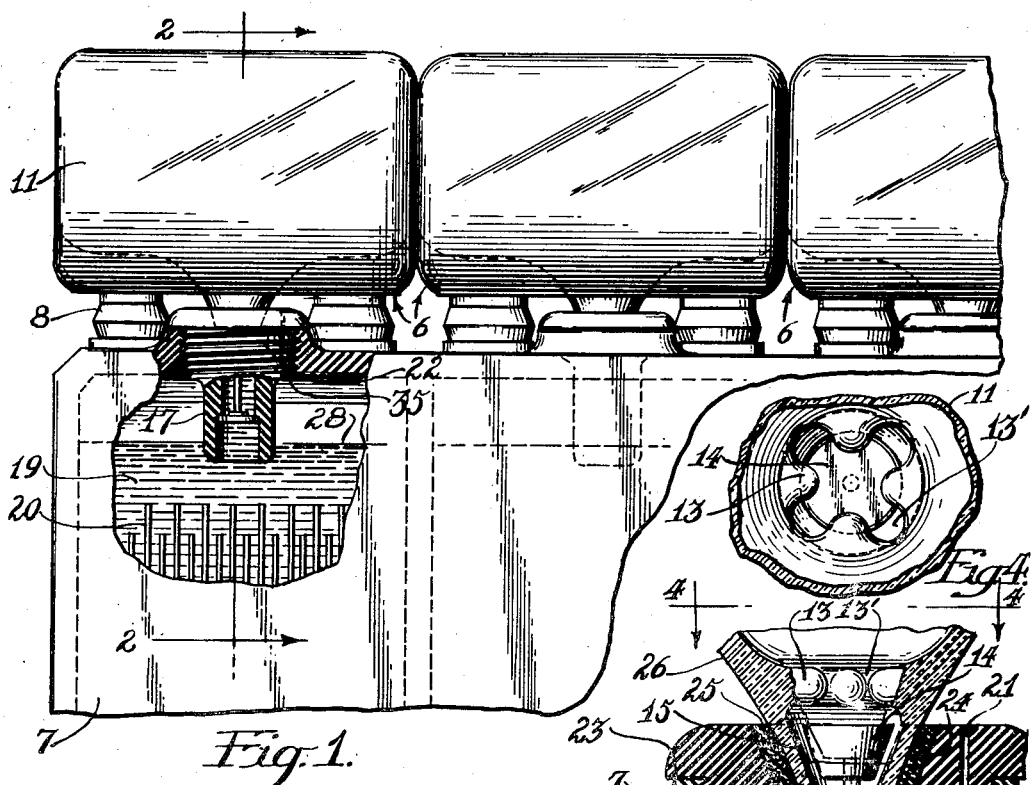
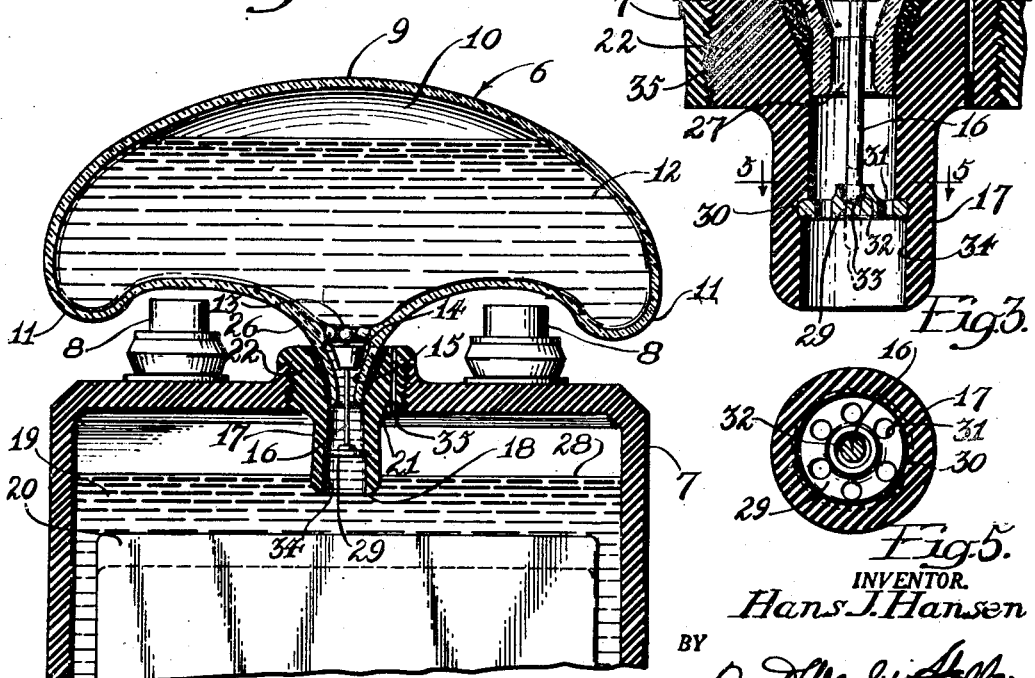
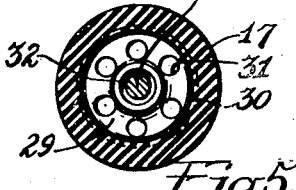
INVENTOR.
Hans J. Hansen
BY
Attorney Patented Jan. 6, 1948

2,433,989

UNITED STATES PATENT OFFICE 2,433,989

MEANS FOR AUTOMATICALLY SUPPLYING DISTILLED WATER TO STORAGE BATTERIES

Hans J. Hansen, Chicago, Ill.

Application October 22, 1946, Serial No. 704,943

9 Claims. (Cl. 136—162)

My invention relates to an automatic filling device for replenishing storage batteries, and the like, with filtered water whenever the liquid therein, has evaporated, and occupies a level below the top surface of the grids, or plates within the cells of the storage battery.

An important object of my invention is to provide a container which has streamlined configuration so as to more or less conform to battery measurements, at the same time providing a compact arrangement; a unit, or container for the filtered water being provided for each cell of a storage battery.

Another important object of my invention is to provide a container of transparent material which may be glass, or plastic which has overhanging, lobed structure so as to permit removal of the partially empty container for refilling, when the occasion arises, thus preventing the spilling of the contents within the container during the removal operation.

A further object of my invention is to provide a device of the aforementioned character which is readily attachable to a storage battery, requiring no improvement in the construction of standard storage batteries, or cells.

A further object of my invention is to provide a simple valve structure in a container such as is used in connection with my invention, the said valve being automatically tripped by trip means when the same is seated and inserted in inverted position to automatically function and supply filtered water, when necessary to restore the normal level of the liquid within the cells of the battery. The said valve construction being also made to automatically seal the container when it is inverted and prior to its being seated within the adapter means, comprising another feature of my invention. The said valve also being gravity actuated when the container is positioned for refilling purposes after removal from its assembly to a storage battery.

Another object of my invention is to provide a novel structure of the aforementioned character which is simple in construction, practical, fool-proof, and efficient in its operation, and of such simple, elemental construction as to warrant economical manufacture thereof in quantity production.

Other features, ancillary objects, and advantages, resident in my invention will become apparent from an examination of the accompanying drawings, bearing further elucidation in the ensuing description, wherein like symbols are used to denote like parts, and in which, Fig. 1 is a front view of a portion of a storage battery with certain portions thereof broken in section, in order to more clearly depict the detailed structure of my invention.

Fig. 2 is an enlarged end view taken on the line 2—2 of Fig. 1, showing a sectional view substantially looking in the direction of arrows 2—2 of Fig. 1.

Fig. 3 is an enlarged view of the adapter means, and the valve structure, comprising important, elemental features of my invention.

Fig. 4 is a view looking in the direction of the arrows 4—4 of Fig. 3.

Fig. 5 is a transverse sectional view taken substantially on the line 5—5 of Fig. 3.

Referring to the various views, my invention is generally designated 6, and it is adapted to being removably attached to the cells of a battery 7; the battery being provided with terminals 8, for connection to the proper electrical devices within an automobile, or other appliances requiring storage battery current supply.

The battery is usually furnished with a threaded opening 35 for each cell, which customarily receives a cap or closure for closing the opening after liquid has been poured into the battery cell. The threaded structure 35 is utilized to receive the adapter bushing 36 which is an important element of my invention, and which has a reduced shank portion 17, and a threaded body 22 of larger dimensions to fit within the threaded opening 35, the said adapter bushing 36 being provided with a head 23 adapted to rest on the top of the shoulder forming the threaded opening 35 in the battery. The said threaded adapter bushing 36, or adapter is also provided with a venting opening 21 to permit the volatile matter and air to escape, making room for the liquid to occupy the confines of the wet cell. The adapter bushing 36 is also provided with a seat 24 which is of frusto-conical formation, and adapted to receive a liner 25 of resilient material, thus furnishing an ideal seal for the frusto-conical neck 26 of the container 9. The container 9 as can be seen, is arcuately shaped, having a space 10 therein for confining filtered battery liquid 12, and is provided with the pendant lobe of annular formation 11 so as to retain therein, small portions of liquid, and to prevent spilling the same when removal of the container 9 becomes mandatory for refilling purposes. By tilting the container 9 any small quantities of liquid will be directed into the pendant lobe 11 thus preventing spilling thereof.

Within the frusto-conical neck 26, I provide a series of projections 13, so as to support the frusto-conical valve 14 when the container 9 is inverted for refilling purposes, causing the larger end of the valve 14 to rest on the projections 13, and permitting the liquid to pass through the intermediate openings 13'.

The neck is also provided with a bore of frusto-conical formation 15, so that when the container 9 has been filled with liquid, and is inverted preparatory to its insertion in the adapter bushing, the liquid contents will not be spilled, and when the neck 26 is seated and sealed within the resilient bushing 25, then the valve stem 16 will be tripped or forced up by the trip support 29, by virtue of the end 33 of the valve stem 16, resting within the cavity 32 of the trip means 29. The said trip means is provided with a flanged structure 30, so as to seat firmly in assembly within the enlarged bore 34, of the bushing 17. The said trip means 29 is also provided with a series of drilled openings 31, so as to permit liquid to pass from the chamber 10 in the container 9, through the bore 27, and through the openings 31 into the confines of the battery, so that the liquid 19 will rise to the level 28 subsequently to the liquid having evaporated from the cell of the battery, and will occupy the level 28 sufficiently above the top edge 20 of the grid plates, and as well above the lower edge 18 of the adapter bushing 36 furnishing an ideal arrangement.

The liquid will be replenished as soon as some of the liquid has been volatilized, and caused to be effused through the venting means 21, thus the liquid in the container 10 will flow until the top level 28 is once again reached, thus maintaining an equilibrium between the liquid 12, confined in the container 9, and that to be confined in the cells of the battery 7.

A container 9 may be provided for each of the cells, or it may be found expedient in manufacture to make one container, having three frusto-conical necks for fitting the same into the respective cell openings of a storage battery.

The level 28 is preferable, assuming the position indicated in Fig. 2, inasmuch as when a storage battery is utilized in an automotive vehicle, or similar construction, the said vehicle, and the battery in position in the said vehicle, are subject to variations in position from the normal, horizontal plane, and hence, in order to maintain the tops of the grids 20, always submerged below the surface of the liquid. The liquid level 28 should be high enough, in order to permit of disturbances of the battery from its normal, horizontal plane without affecting appreciably the coverage of the grid plates with the liquid, a condition so vital in the efficient operation of the storage battery cell in generating the electrical energy required.

The present illustration shows but one embodiment of the principle of the present invention, and it will be understood therefore, that the invention is capable of various changes and modifications without departing from the scope of the invention, and I am aware that changes may be made in the general arrangement, and in the combination of the various parts, without departing from the scope of the present invention, as set forth in the foregoing specification, and as defined in the clauses of the claims which are appended to the foregoing specification; hence, I do not limit my present invention to the exact arrangement and combination of the various elemental structures, and parts, as described in the said specification, nor do I confine myself to the exact details of the construction of the said part as illustrated in the accompanying claims.

Having thus described and disclosed my invention, what I claim as novel and desire to secure by Letters Patent, is:

1. A device for automatically supplying a cell of a storage battery with distilled water comprising, an adapter bushing having a threaded body portion adapted to fit the filling opening of a storage battery cell and provided with a reduced shank portion extending below the liquid level of said cell, a frusto-conical resilient liner secured to the top opening of said adapter bushing, trip means secured adjacent the lower edge of the said shank portion, a transparent container of pendant lobed cross-sectional configuration terminating in a frusto-conical neck portion adapted to seat removably in the said frusto-conical resilient liner, and provided with a multiplicity of radially positioned projections below the top of said neck portion and interiorly thereof, and frusto-conical valve means confined in the said neck portion and susceptible of limited vertical movement, the said valve means being provided with a stem portion having its terminus resting on the said trip means.

2. A device for automatically supplying a cell of a storage battery with distilled water comprising, an adapter bushing secured to the filling opening of said cell, trip means secured to the interior bore of said adapter bushing, a transparent container of pendant lobed cross-sectional configuration terminating in a frusto-conical neck portion adapted to seat removably at the top of the said adapter bushing, and gravity actuated valve means disposed interiorly of the said neck portion and provided with a stem portion constructed and arranged to be tripped by the said trip means when the said container is in assembly with the said adapter bushing.

3. A device for automatically supplying a cell of a storage battery with distilled water comprising, an adapter bushing secured to the filling opening of said cell, trip means secured to the interior bore of said adapter bushing, a transparent container of pendant lobed cross-sectional configuration terminating in a frusto-conical neck portion adapted to seat removably at the top of the said adapter bushing, and gravity actuated valve means disposed interiorly of the said neck portion and provided with a stem portion constructed and arranged to be tripped by the said trip means when the said container is in assembly with the said adapter bushing, the lower interior portion of the said neck portion being provided with radially disposed projections to afford limited vertical movement to the said gravity actuated valve means.

4. A device for automatically supplying a cell of a storage battery with distilled water comprising, an adapter bushing having a threaded body portion adapted to fit the filling opening of a storage battery cell and provided with a reduced shank portion extending below the liquid level of said cell, a frusto-conical resilient liner secured to the top opening of said adapter bushing, trip means secured adjacent the lower edge of the said shank portion, a transparent container of pendant lobed cross-sectional configuration terminating in a frusto-conical neck portion adapted to seat removably in the said frusto-conical resilient liner, and provided with a multiplicity of radially positioned projections below the top of said neck portion and interiorly thereof, and frusto-conical valve means confined in the said neck portion and susceptible of limited vertical movement, the said valve means being provided with a stem portion having its terminus resting on the said trip means, the said adapter bushing provided with a venting orifice to permit displacement of the volatile matter within the cell by filtered water.

5. A device for automatically supplying a cell of a storage battery with distilled water comprising, an adapter bushing secured to the filling opening of said cell, trip means secured to the interior bore of said adapter bushing, a transparent container of pendant lobed cross-sectional configuration terminating in a frusto-conical neck portion adapted to seat removably at the top of the said adapter bushing, and gravity actuated valve means disposed interiorly of the said neck portion and provided with a stem portion constructed and arranged to be tripped by the said trip means when the said container is in assembly with the said adapter bushing, the said adapter bushing provided with a venting orifice to permit displacement of the volatile matter within the cell by filtered water.

6. A device for automatically supplying a cell of a storage battery with distilled water comprising, an adapter bushing secured to the filling opening of said cell, trip means secured to the interior bore of said adapter bushing, a transparent container of pendant lobed cross-sectional configuration terminating in a frusto-conical neck portion adapted to seat removably at the top of the said adapter bushing, and gravity actuated valve means disposed interiorly of the said neck portion and provided with a stem portion constructed and arranged to be tripped by the said trip means when the said container is in assembly with the said adapter bushing, the lower interior portion of the said neck portion being provided with radially disposed projections to afford limited vertical movement to the said gravity actuated valve means, the said adapter bushing provided with a venting orifice to permit displacement of the volatile matter within the cell by filtered water.

7. A device for automatically supplying a cell of a storage battery with distilled water comprising, an adapter bushing having a threaded body portion adapted to fit the filling opening of a storage battery cell and provided with a reduced shank portion extending below the liquid level of said cell, a frusto-conical resilient liner secured to the top opening of said adapter bushing, trip means secured adjacent the lower edge of the said shank portion, a transparent container of pendant lobed cross-sectional configuration terminating in a frusto-conical neck portion adapted to seat removably in the said frusto-conical resilient liner, and provided with a multiplicity of radially positioned projections below the top of said neck portion and interiorly thereof, and frusto-conical valve means confined in the said neck portion and susceptible of limited vertical movement, the said valve means being provided with a stem portion having its terminus resting on the said trip means, the said adapter bushing provided with a venting orifice to permit displacement of the volatile matter within the cell by filtered water, the said trip means being provided with a multiplicity of openings radially disposed therethrough and a cavity for retaining in vertical position the terminal of the stem portion of the said valve means.

8. A device for automatically supplying a cell of a storage battery with distilled water comprising, an adapter bushing secured to the filling opening of said cell, trip means secured to the interior bore of said adapter bushing, a transparent container of pendant lobed cross-sectional configuration terminating in a frusto-conical neck portion adapted to seat removably at the top of the said adapter bushing, and gravity actuated valve means disposed interiorly of the said neck portion and provided with a stem portion constructed and arranged to be tripped by the said trip means when the said container is in assembly with the said adapter bushing, the said adapter bushing provided with a venting orifice to permit displacement of the volatile matter within the cell by filtered water, the said trip means being provided with a multiplicity of openings radially disposed therethrough and a cavity for retaining in vertical position the terminal of the stem portion of the said valve means.

9. A device for automatically supplying a cell of a storage battery with distilled water comprising, an adapter bushing secured to the filling opening of said cell, trip means secured to the interior bore of said adapter bushing, a transparent container of pendant lobed cross-sectional configuration terminating in a frusto-conical neck portion adapted to seat removably at the top of the said adapter bushing, and gravity actuated valve means disposed interiorly of the said neck portion and provided with a stem portion constructed and arranged to be tripped by the said trip means when the said container is in assembly with the said adapter bushing, the lower interior portion of the said neck portion being provided with radially disposed projections to afford limited vertical movement to the said gravity actuated valve means, the said adapter bushing provided with a venting orifice to permit displacement of the volatile matter with the cell by filtered water, the said trip means being provided with a multiplicity of openings radially disposed therethrough and a cavity for retaining in vertical position the terminal of the stem portion of the said valve means.

HANS J. HANSEN.

REFERENCES CITED

The following references are of record in the file of this patent:

UNITED STATES PATENTS

| Number | Name | Date |
|---|---|---|
| 1,506,172 | Fredette | Aug. 26, 1924 |
| 2,046,776 | Edelmann | July 7, 1936 |